(12) United States Patent
Siew et al.

(10) Patent No.: US 10,713,935 B2
(45) Date of Patent: Jul. 14, 2020

(54) CONTROL SERVICE FOR CONTROLLING DEVICES WITH BODY-ACTION INPUT DEVICES

(71) Applicant: Nokia Technologies Oy, Espoo (FI)

(72) Inventors: Aik Hua Siew, San Jose, CA (US);
Timo Virtanen, San Jose, CA (US);
Pratibha Gupta, Menlo Park, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/903,839

(22) Filed: Feb. 23, 2018

(65) Prior Publication Data

US 2019/0266885 A1   Aug. 29, 2019

(51) Int. Cl.
*G08C 17/00* (2006.01)
*G06F 3/01* (2006.01)
*B64C 39/02* (2006.01)

(52) U.S. Cl.
CPC .......... *G08C 17/00* (2013.01); *G06F 3/017* (2013.01); *B64C 39/024* (2013.01); *B64C 2201/146* (2013.01); *G08C 2201/70* (2013.01)

(58) Field of Classification Search
CPC ................................ G08C 17/00; G06F 3/017
See application file for complete search history.

(56) References Cited

U.S. PATENT DOCUMENTS

2006/0141997 A1\* 6/2006 Amiens ............... G08C 17/02
 455/418
2012/0038550 A1   2/2012 Lemmey et al.
(Continued)

FOREIGN PATENT DOCUMENTS

EP   3051514 A1   8/2016
EP   3094045 A1   11/2016
WO   WO 2016167946 A1   10/2016

OTHER PUBLICATIONS

Zhenfei Zhao, Hao Luo, Guang-Hua Song, Zhou Chen, Zhe-Ming Lu, and Xiaofeng Wu, "Web-based interactive drone control using hand gesture", Review of Scientific Instruments 89, 014707 (2018); https://doi.org/10.1063/1.5004004, Published Online: Jan. 2018.
(Continued)

*Primary Examiner* — Nabil H Syed
(74) *Attorney, Agent, or Firm* — Locke Lord LLP

(57) ABSTRACT

Method, apparatus, and computer program product example embodiments provide control services for controlling devices with body-action input devices. An example method includes subscribing, by a control service, to one or more sensor signals from a selected body-action input device, the sensor signals including raw sensor data corresponding to one or more body-actions with the selected input device. The control service analyzes, using a selected component control service, the raw sensor data, to identify a body-action input corresponding to the body-actions with the selected input device. The control service converts, using the selected component control service, the identified body-action input, into one or more control signals, to control the selected controlled device corresponding to body-actions with the selected input device. The control service then provides the control signals to control the selected controlled device in response to the body-actions with the selected input device.

20 Claims, 14 Drawing Sheets

(56) References Cited

U.S. PATENT DOCUMENTS

| | | | |
|---|---|---|---|
| 2013/0101002 A1* | 4/2013 | Gettings | H04N 19/172 |
| | | | 375/224 |
| 2013/0201316 A1 | 8/2013 | Binder et al. | |
| 2014/0269441 A1 | 9/2014 | Hyde et al. | |
| 2015/0035743 A1* | 2/2015 | Rosener | G06F 3/014 |
| | | | 345/156 |
| 2015/0312404 A1 | 10/2015 | Abramson et al. | |
| 2016/0109951 A1* | 4/2016 | Baldwin | G06F 3/017 |
| | | | 340/12.5 |
| 2016/0109954 A1 | 4/2016 | Harris et al. | |
| 2016/0119426 A1* | 4/2016 | Van De Poel | G06F 3/0604 |
| | | | 709/213 |
| 2016/0209059 A1* | 7/2016 | Castillo | G05B 15/02 |
| 2016/0381144 A1 | 12/2016 | Malik et al. | |
| 2017/0095670 A1* | 4/2017 | Ghaffari | A61B 5/0024 |
| 2017/0187625 A1 | 6/2017 | Nolan et al. | |
| 2017/0255198 A1 | 9/2017 | Rodriguez | |
| 2018/0006840 A1 | 1/2018 | Su et al. | |
| 2018/0314230 A1* | 11/2018 | Adler | G05B 19/409 |
| 2019/0019402 A1* | 1/2019 | Nachshon | G08C 17/00 |

OTHER PUBLICATIONS

Neßelrath, Robert, et al. "A Gesture Based System for Context—Sensitive Interaction with Smart Homes." Ambient Assisted Living. Springer, Berlin, Heidelberg, 2011. 209-219.
International Search Report for International Application No. PCT/IB2019/051340 completed May 20, 2019.

* cited by examiner

CONTROL SERVICE FOR CONTROLLING DEVICES WITH BODY-ACTION INPUT DEVICES

FIELD

The technical field relates to control services for controlling devices with body-action input devices.

BACKGROUND

Existing solutions for controlling diverse types of devices with a body-action input device, require that multiple device-specific applications must be installed in the input device to translate sensor signals for each of the diverse types of controlled devices. Not only does this arrangement consume significant amounts of CPU, memory and battery power in the input device, but the arrangement is not amenable to occasional updating the multiple device-specific applications.

SUMMARY

Method, apparatus, and computer program product example embodiments provide control services for controlling devices with body-action input devices. An example method includes subscribing, by a control service, to one or more sensor signals from a selected body-action input device, the sensor signals including raw sensor data corresponding to one or more body-actions with the selected input device. The control service analyzes, using a selected component control service, the raw sensor data, to identify a body-action input corresponding to the body-actions with the selected input device. The control service converts, using the selected component control service, the identified body-action input, into one or more control signals, to control the selected controlled device corresponding to body-actions with the selected input device. The control service then provides the control signals to control the selected controlled device in response to the body-actions with the selected input device.

In an example embodiment, the control service receives identification information of a selected body-action input device selected from a plurality of available body-action input devices. The control service receives identification information of a selected controlled device selected from a plurality of available controlled devices. The control service selects a component control service from a plurality of component control services of the control service, each component control service corresponding to one of the plurality of available body-action input devices and one of the plurality of available controlled devices, based on the identification information of the selected body-action input device and the identification information of the selected controlled device. In this manner, a body-action input device does not need to store multiple device-specific applications to be able to control diverse types of controlled devices. Also, diverse types of body-action input devices may control the same type of controlled device without needing to store the device-specific application for controlled device. Moreover, the example embodiment is amenable to frequent updating of device-specific applications without needing to access each body-action input device to perform the updating.

DESCRIPTION OF THE FIGURES

Some example embodiments will now be described with reference to the accompanying drawings.

DISCUSSION OF EXAMPLE EMBODIMENTS

Example embodiments provide control services for controlling devices with body-action input devices that do not need to store multiple device-specific applications to be able to control diverse types of controlled devices. The example embodiment is amenable to frequent updating of device-specific applications without needing to access each body-action input device to perform the updating.

Figure 1A:
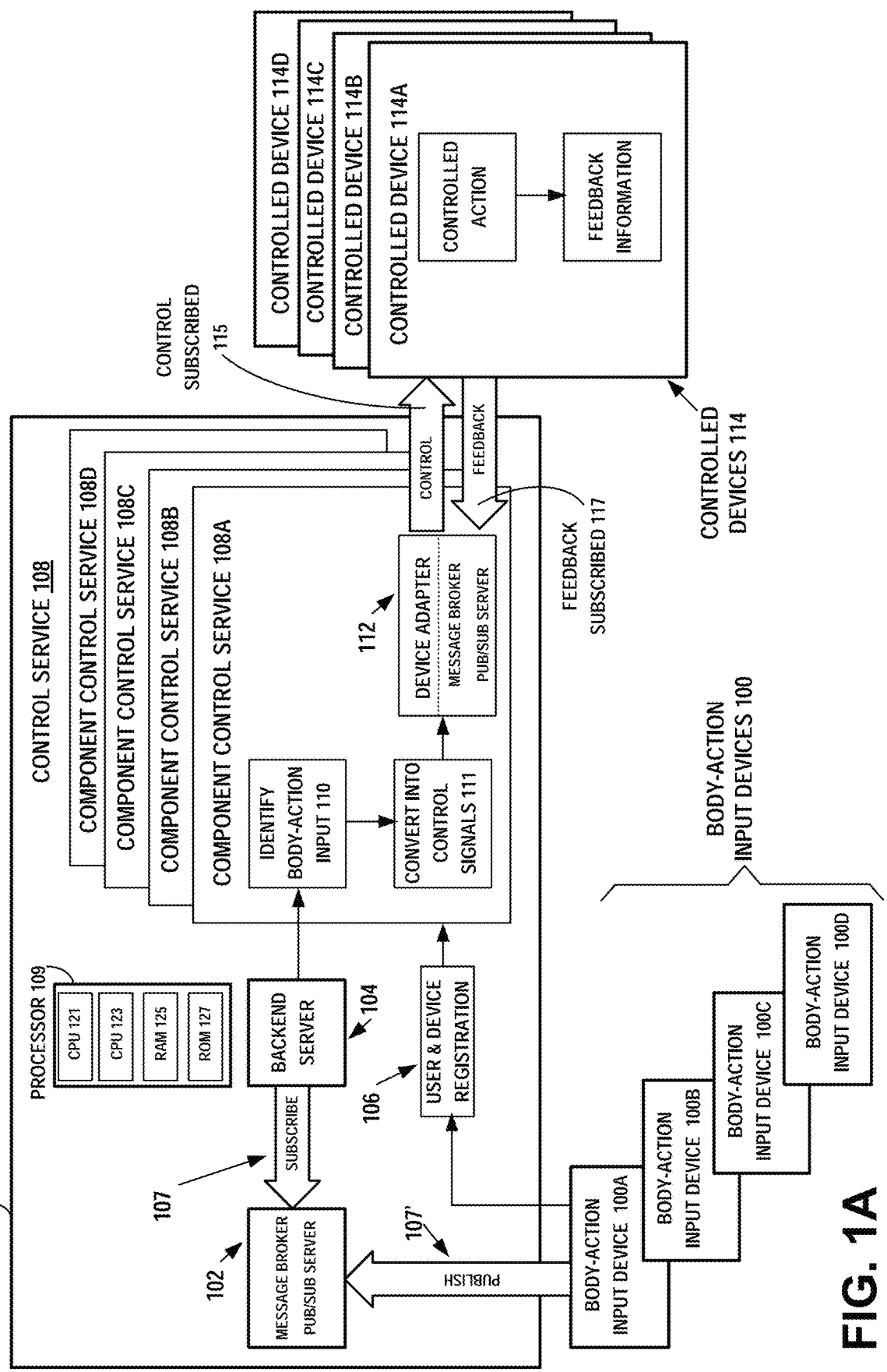
FIG. 1A shows an example architecture diagram of an example embodiment of an example control service for controlling devices with body-action input devices.

FIG. 1A shows an example architecture diagram of an example embodiment of an example control service 108 for controlling one or more devices 114A to 114D with one or more body-action input devices 100A to 100D which may be attached to any body part. The example control service 108 may comprise software or circuitry. The main functionalities of an example control service 108 may be implemented in one or more cloud servers 90 away from the body-action input devices 100 and the controllable devices 114. The one or more cloud servers 90 use a network of one or more remote servers hosted on the Internet to store, manage, and process data. In other example embodiments, the main functionalities of an example control service 108 may be implemented as software or circuitry located away from the body-action input devices 100 and the controllable devices 114. This enables flexibility and scalability of the system and increases the number of controllable devices and input devices that may be connected in the system. Whether the main functionalities of an example control service 108 are implemented as software or circuitry or in the one or more cloud servers 90, an example processor 109 is shown associated with the example control service 108, to execute computer code instructions stored in one or more memories 125, 127, which when executed by one or more central processing units (CPUs) and/or circuitries 121, 123, carry out the one or more functions of the example embodiments of the example control service 108. In a similar manner, the publish/subscription server 102, the backend server 104 and the user and device registration unit 106 may have a similar architecture design with the example control service 108. As used in this application, the term "circuitry" may refer to one or more or all of the following:
(a) hardware-only circuit implementations (such as implementations in only analog and/or digital circuitry) and
(b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), which requires software (e.g., firmware) for operation, but the software may not be present when it is not needed for operation."
This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The example control service 108 includes, at least, one or more component control services 108A, 108B, 108C, and 108D, one or more backend servers 104, and a user and device registration unit 106. One or more of body-action input devices 100A, 100B, 100C, and 100D are shown collectively as 100. The user-selected body-action input device 100A outputs one or more sensor signals including raw sensor data corresponding to one or more of the user's body-actions with the selected input device 100A. The body-action input device 100A publishes the raw sensor data at 107' to one or more intermediary messaging brokers at one or more publish/subscription servers 102, to be buffered on a common platform with the backend server 104, until they are subscribed at 107 by the backend server 104. In this manner, the body-action input device does not need to manage the sensor data flow.

A plurality of controlled devices 114A, 114B, 114C, and 114D are shown collectively as 114. The control service 108 selects, for example, a component control service 108A from the plurality of component control services 108A, 108B, 108C, and 108D of the control service 108, based on an identification of a selected body-action input device 100A and/or an identification of a selected controlled device 114A, wherein each component control service corresponding to an example—input device 100 of the plurality of available body-action input devices 100A, 100B, 100C, and 100D and wherein each controllable device corresponding to an example controllable device 114 of the plurality of available controlled devices 114A, 114B, 114C, and 114D. An example software or circuitry for the control service 108 to select a device control system based on an identification of a selected body-action input device and/or an identification of a selected controlled device, is described later herein in conjunction with FIG. 1F.

The control service 108 analyzes, using the selected component control service 108A, the raw sensor data, to identify a body-action input at 110 corresponding to the user's one or more body-actions while interacting with the selected body-action input device 100A. An example software or circuitry to identify a body-action input at 110 may be by pattern recognition, as is described later herein in conjunction with FIG. 1E. The control service 108 converts, using the selected component control service 108A, the identified body-action input at 111, into one or more control signals to the device adapter 112, to control the selected controlled device 114A corresponding to the user's one or more body-actions while interacting with the selected body-action input device 100A. An example software or circuitry to convert the identified body-action input at 111, into one or more control signals to the device adapter 112, may be by table lookup, as is described later herein in conjunction with FIG. 1E. The control service 108 then provides the one or more control signals to control the selected controlled device 114A, in response to the user's one or more body-actions while interacting with the selected body-action input device 100A. The controlled device 114A, in response, may perform a controlled action and may provide feedback information to the control service 108.

In one exemplary embodiments, the device adapter 112 publishes the one or more control signals to an intermediary messaging broker that may be part of the device adapter 112, a publish/subscription server similar to the publish/subscription server 102, to be buffered on a common platform with the controlled device 114, until the control signals are subscribed at 115 by the controlled device 114. In this manner, the controlled device 114 does not need to manage the control signal data flow. The controlled device 114 publishes any feedback signals back to the intermediary messaging broker, the publish/subscription server in the device adapter 112, to be buffered on a common platform with the device adapter 112, until the feedback signals are subscribed at 117 by the device adapter 112. In this manner, the device adapter 112 does not need to manage the feedback signal data flow. In another exemplary embodiments, the device adapter 112 transmits the one or more control signals to the controlled device 114 when the one or more control signals are ready. Additionally, the controlled device 114 can transmit one or more feedback signals, for example raw sensor data from one or more of sensors in the controlled device 114, the back to the device adapter 112.

In one example embodiment, the publish/subscription server 102, the one or more backend servers 104, the user and device registration unit 106, and the example control service 108 are located in the one or more cloud servers 90 under one service system that is managed by one service provider.

In another example embodiment, the publish/subscription server 102, the one or more backend servers 104, the user and device registration unit 106, and the example control service 108 are located in the one or more cloud servers 90, but as separately managed services with many service providers and separate devices/servers.

In another example embodiment, the publish/subscription server 102, the one or more backend servers 104, the user and device registration unit 106, and the example control service 108 may be separate devices/servers.

In another example embodiment, the publish/subscription server 102, the one or more backend servers 104, the user and device registration unit 106, and the example control service 108 may be one single device/server.

In another example embodiment, the one or more backend servers 104 and the example control service 108 may be one single device/server.

In another example embodiment, the publish/subscription server 102, the one or more backend servers 104, the user and device registration unit 106, and the example control service 108 may be arranged in any combinations or numbers of devices/servers, which can be managed by one or more service providers.

In another example embodiment, the publish/subscription server 102, the one or more backend servers 104, the user and device registration unit 106, and the example control service 108 and their combinations may be located in a home network, in any combinations of a home router and/or gateway, in a specific home network access point, on a home Internet of Things (IoT) network, in a home IoT gateway, in home network access point, a home server computer, etc.

In another example embodiment, the publish/subscription server 102, the one or more backend servers 104, the user and device registration unit 106, and the example control service 108, taken singly or in any of their combinations, may be located in any local area networks, such as industrial networks or office networks.

In another example embodiment, the publish/subscription server 102, the one or more backend servers 104, the user and device registration unit 106, and the example control service 108, taken singly or in any of their combinations, may be located in a wireless telecommunication network, for example as a cloud-edge or mobile edge computing (MEC) implementation.

In another example embodiment, the publish/subscription server 102, the one or more backend servers 104, the user and device registration unit 106, and the example control service 108, taken singly or in any of their combinations, may be implemented as one or more entities having at least one CPU connected to at least one memory and at least one computer program code.

In another example embodiment, the publish/subscription server 102, the one or more backend servers 104, the user and device registration unit 106, and the example control service 108, taken singly or in any of their combinations, may be implemented as one or more entities having at least one circuitry.

In another example embodiment, the publish/subscription server 102, the one or more backend servers 104, the user and device registration unit 106, and the example control service 108, may be connected to each other via any type of wireless communication link or wireline connection, such as an optical fiber connection, or any combination.

In another example embodiment, all wireless communication protocols/technologies may be used in any combinations in the wireless links 107, and 107' between the body-action input device 100 and the backend server 104, for example, Wireless IoT communication protocols, such as SigFox, LoRaWAN, NB-IoT, etc., and Wireless telecommunication protocols such as 2G, LTE, 4G, 5G, any future G, etc., as well as short range wireless communication protocols, such as Bluetooth, Bluetooth Low Energy, WLAN, ZigBee, NFC, ANT, ANT+ etc.

The selected body-action input device 100A may be at least one of a hand gesture input device to provide sensor signals in response to hand gestures of a user, a wearable body-action input device to provide sensor signals in response to body-actions of the user, a heartbeat input device to provide sensor signals in response to heartbeats of the user, or an eye-motion tracking input device to provide sensor signals in response to eye-motion of the user. The selected controlled device 114 may be at least one of a drone, an unmanned aerial vehicle (UAV), an unmanned terrestrial vehicle, and unmanned ground vehicle (UGV), a physical device, a home appliance, or an industrial appliance that is controlled over a wireless communications link.

Figure 1B:
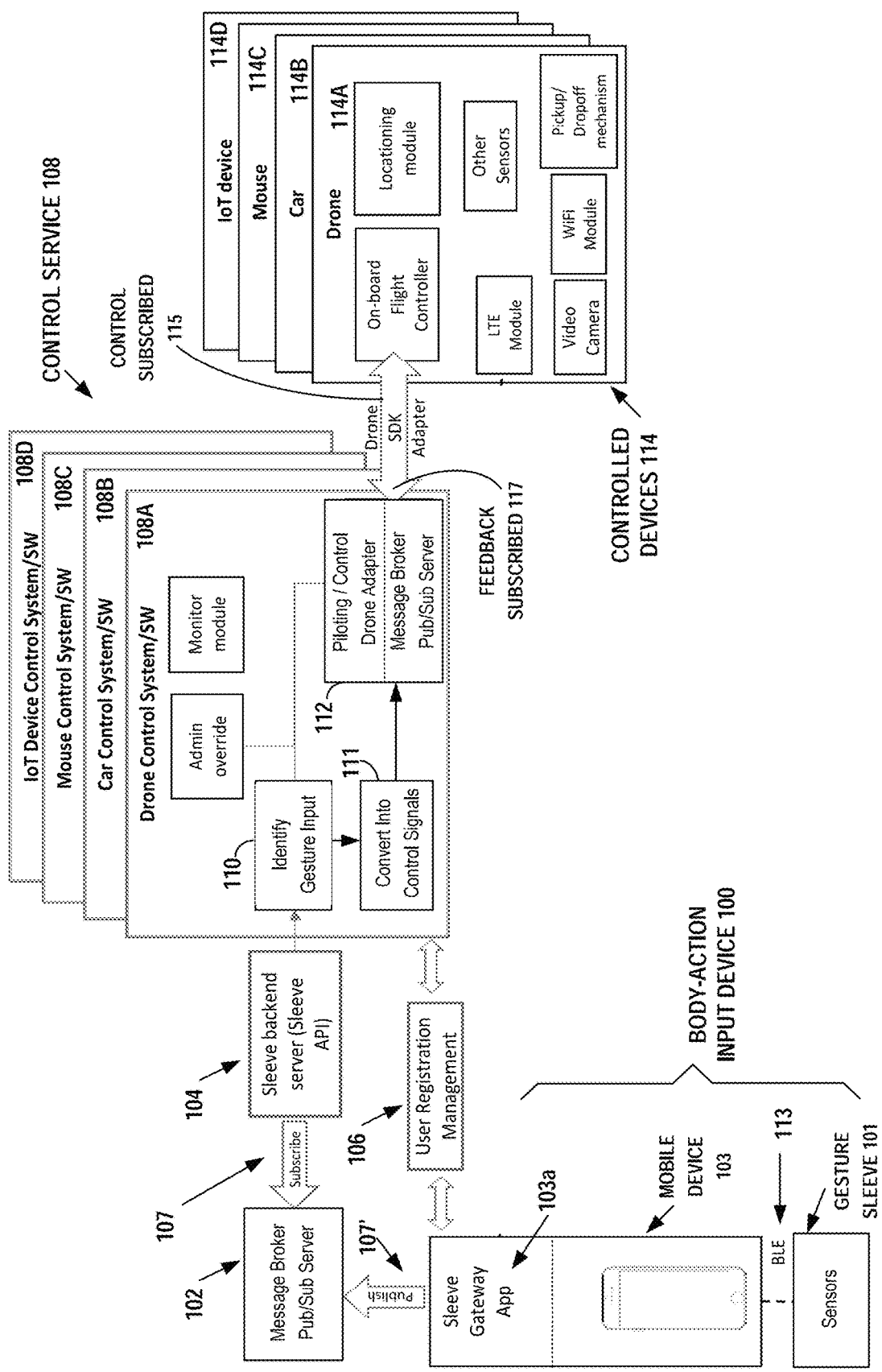
FIG. 1B shows an example architecture diagram of another example embodiment, wherein an example of the body-action input device is a gesture sensing device and an example of the controlled device is a drone.

FIG. 1B shows an example architecture diagram of another example embodiment, wherein an example of the body-action input device 100 is a gesture sensing device and an example of the controlled device 114 is a drone. The selected body-action input device 100 includes a gesture sensing sleeve 101 to be worn by the user, which includes one or more short range wireless communication transceivers, circuitries and/or interfaces 113, for example Bluetooth Low Energy (BLE), Bluetooth (BL), wireless local area network (WLAN), interface. The example gesture sensing device 101 may include input devices such as touch pads, accelerometers, gyroscopes, and/or devices to detect the physiological condition of the user, for sending signals to the control service 108. The example gesture sensing device 101 may include annunciator devices such as speakers, displays and/or haptics devices for receiving feedback signals from he controlled device 114. The selected body-action input device 100 further includes a separate mobile communications device, modem or circuitry 103 that is proximate to or carried by the user, which includes a Bluetooth Low Energy interface 113 to receive the raw sensor data from the gesture sensing sleeve 101. The mobile communications device 103 further includes a sleeve gateway application 103a for communication of the raw sensor data over a wireless telecommunications link 107' and 107 to the control service 108, the control service including a backend server 104 configured to subscribe to the raw sensor data from the body-action input device 100 via the gateway application 103a in the mobile communications device 103. The body-action input device 100 publishes the raw sensor data at 107' to an intermediary messaging broker, the publish/subscription server 102, to be buffered on a common platform with the backend server 104, until the raw sensor data are subscribed at 107 by the backend server 104. In this manner, the body-action input device 100 does not need to manage the sensor data flow.

The sleeve gateway app 103a in the mobile communications device 103 detects gestures based on the raw sensor data. In one exemplary option, the raw sensor data is sent to the publish/subscription server 102 with an identification of the body-action input device 100 and a timestamp. In another exemplary option the data is collected, cached, and sent in a batch to the publish/subscription server 102 at a publication rate of a predetermined number of messages per second. The publication rate can be determined based on the capabilities of the wireless telecommunications link 107' or a latency status of the wireless telecommunications link 107'. It is possible that several data points of same type (e.g. Raw Data) are in the same batch, which is acceptable since a data point would contain a timestamp when it was generated, so that the Gesture Control Service may process them correctly.

The example control service 108 is shown having a pool of configurable system resources including a plurality of component control services 108A, 108B, 108C, and 108D, each component control service configured to identify a body-action input for a specific selected body-action input device and convert the identified body-action input, into one or more control signals, for a specific selected controlled device 114A, 114B, 114C, and 114D. An example drone control system/software (SW) or circuitry 108A is designed to use gesture signals from the gesture sleeve 101 to provide control signals to a drone 114A. An example car control system/software (SW) or circuitry 108B is designed to use gesture signals from the gesture sleeve 101 to provide control signals to a vehicle or car 114B. An example mouse control system/software (SW) or circuitry 108C is designed to use gesture signals from the gesture sleeve 101 to provide control signals to a mouse 114C. And, an example Internet of Things (IoT) control system/software (SW) or circuitry 108D is designed to use gesture signals from the gesture sleeve 101 to provide control signals to an IoT device 114D, wherein the IoT device can be for example a home appliance or an industrial appliance.

In one example embodiment, the gesture sleeve 101, mobile device 103, and sleeve gateway app 103a are embedded in a single device, such a gesture sleeve input device 101, a smart watch, a virtual reality (VR) headset, an augmented reality (AR) headset/glasses, etc.

In another example embodiment, the gesture sleeve 101 is separate device from mobile communication device 103.

In another example embodiment, all wireless communication protocols/technologies may be used in any combinations in the wireless link 113 between the gesture sleeve 101 and the mobile device 103, for example, short range wireless communication protocols, such as Bluetooth, Bluetooth Low Energy, WLAN, ZigBee, NFC, ANT, ANT+ etc., as well as example longer range protocols, for example Wireless IoT communication protocols, such as SigFox, LoRaWAN, NB-IoT, etc., and Wireless telecommunication protocols such as 2G, LTE, 4G, 5G, any future G, etc.

In another example embodiment, all wireless communication protocols/technologies may be used in any combinations in the wireless links 107, and 107' between the mobile device 103 and the backend server 104, for example, Wireless IoT communication protocols, such as SigFox, LoRaWAN, NB-IoT, etc., and Wireless telecommunication protocols such as 2G, LTE, 4G, 5G, any future G, etc., as well as short range wireless communication protocols, such as Bluetooth, Bluetooth Low Energy, WLAN, ZigBee, NFC, ANT, ANT+ etc.

Figure 1C:
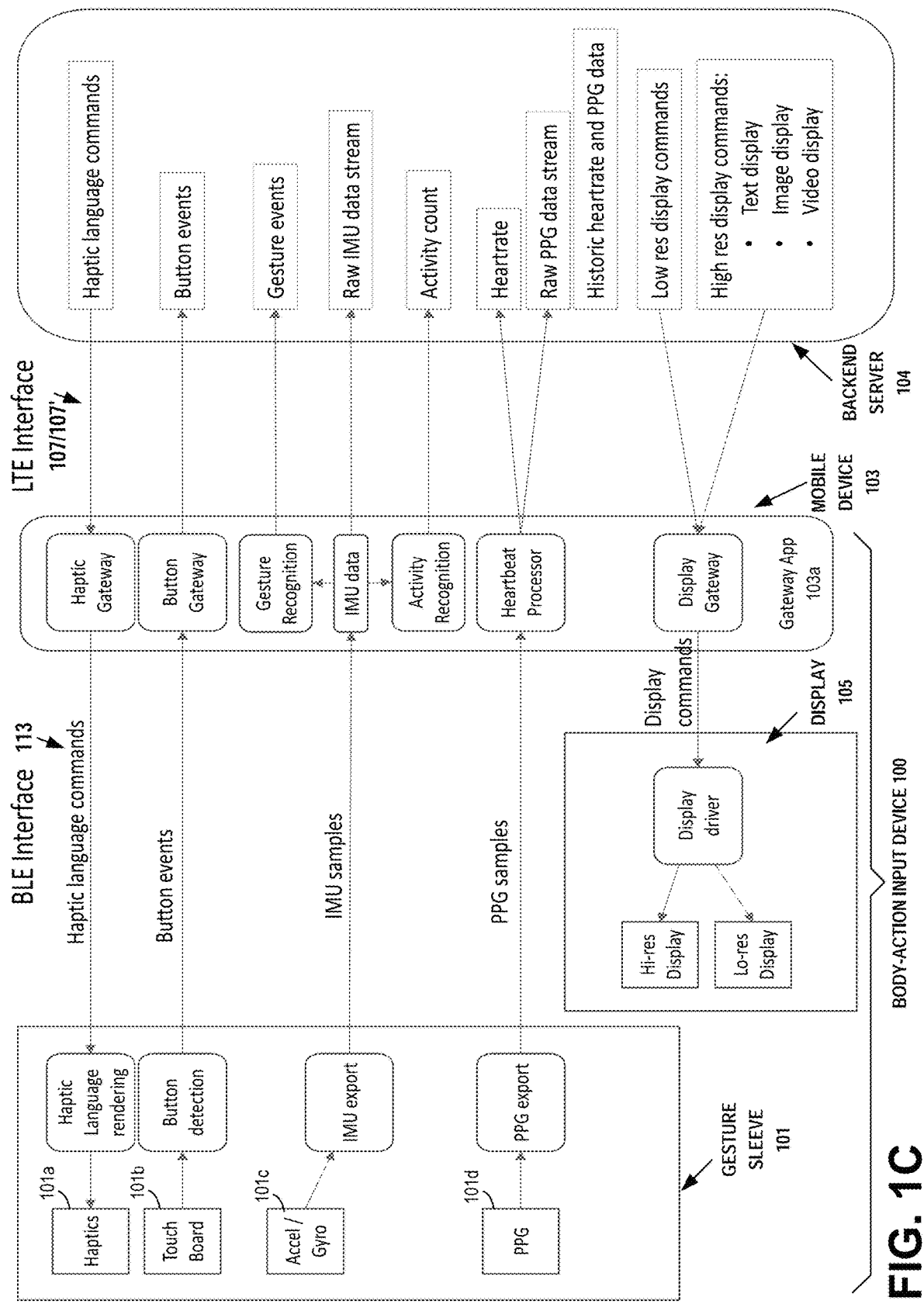
FIG. 1C shows an example architecture diagram of another example embodiment, showing some detail of the example gesture sensing device of FIG. 1B.

FIG. 1C shows an example architecture diagram showing some detail of the example gesture sensing device 101 of FIG. 1B. The selected body-action input device 100 includes the gesture sensing sleeve 101 to be worn by the user, which includes a short range wireless communication transceiver, circuitry and/or interface 113, for example a Bluetooth Low Energy interface. The selected body-action input device 100 further includes a separate mobile communications device 103 that is proximate to or carried by the user, which includes a short range wireless communication transceiver, circuitry and/or interface 113, for example a Bluetooth Low Energy interface, to receive the raw sensor data from the gesture sensing sleeve 101. The mobile communications device 103 further includes a sleeve gateway application 103a, that comprises a wireless communication transceiver, circuitry and/or interface for communication of the raw sensor data over an LTE (Long-term Evolution), 5G ($5^{th}$ generation) or any later generation wireless telecommunications technology over the link 107' and 107 to the backend server 104 of the control service 108.

The example gesture sensing device 101 is shown including one or more haptics devices and interfaces 101a for receiving feedback signals via the mobile device 103, from the backend server 104. The example gesture sensing device 101 is shown including one or more touch board devices and interfaces 101b for sending touch button signals via the mobile device 103, to the backend server 104. The example gesture sensing device 101 is shown including one or more accelerometer/gyro/IMU (inertial measurement unit) sensors and interfaces 101c for sending motion signals via the mobile device 103, to the backend server 104. The example gesture sensing device 101 is shown including one or more PPG (photoplethysmography) sensors and interfaces 101d for sending one or more heartbeat signals via the mobile device 103, to the backend server 104. The example gesture sensing device 101 is shown including one or more blood pressure sensors and interfaces (not shown on fig.) for sending blood pressure signals via the mobile device 103, to the backend server 104. The mobile communications device 103 is shown including applications to interpret and/or pass these signals to or from the backend server 104. The backend serve 104 is shown including applications to process and/or pass these signals or events to or from the control service 108. A display 105 is shown receiving display commands from a display gateway of the mobile communications device 103, the display commands and/or feedback being received from the backend server 104.

Figure 1D:
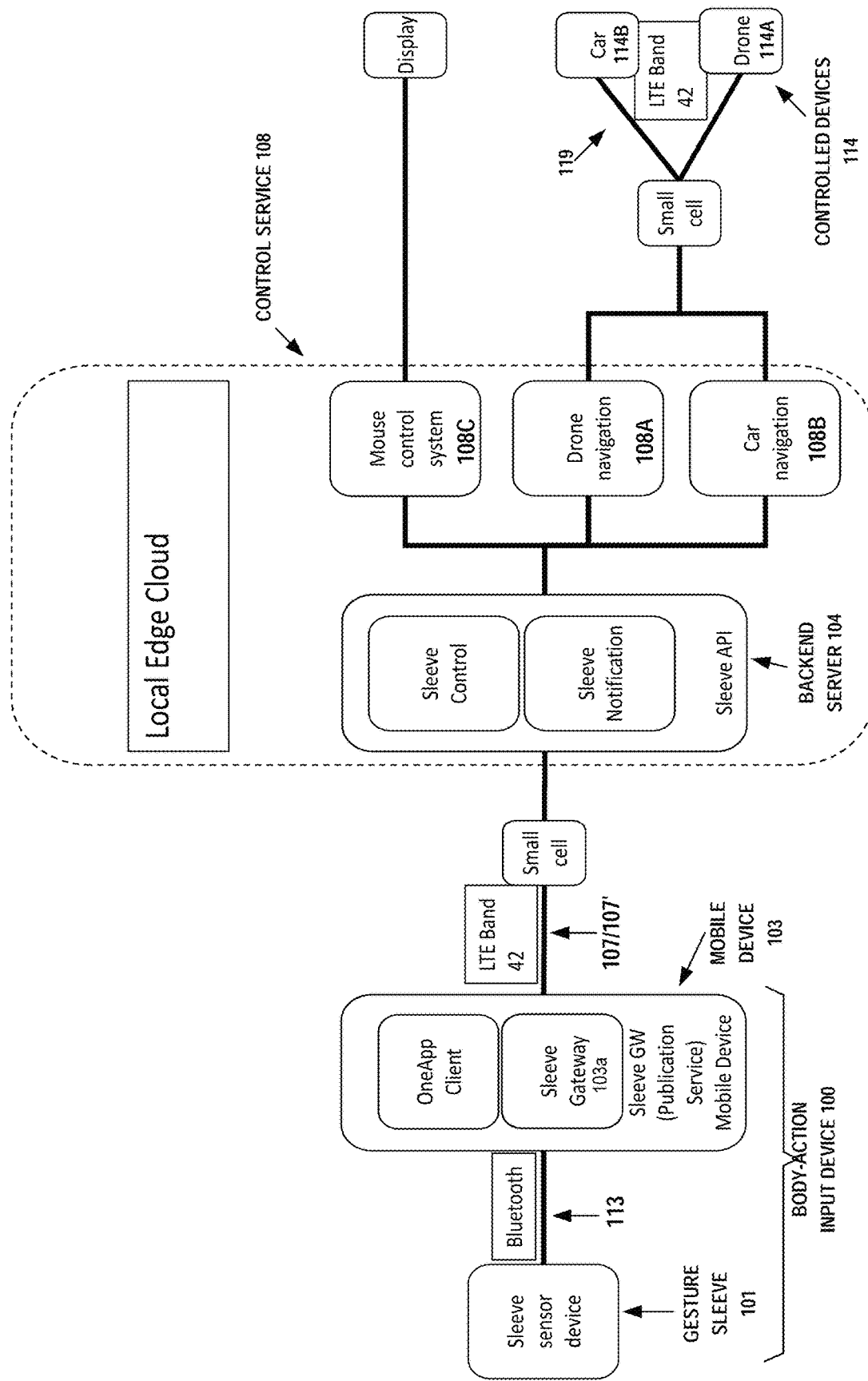
FIG. 1D shows an example architecture diagram of another example embodiment, showing some detail of an example communications network between the example gesture sensing device and example controlled devices of FIG. 1B.

FIG. 1D shows an example architecture diagram showing some detail of an example communications network between the example gesture sensing device 101 and example controlled devices 114 of FIG. 1B. The gesture sensing sleeve 101 includes a short range wireless communication transceiver, circuitry and/or interface, such as a Bluetooth Low Energy interface, and the mobile communications device 103 includes a short grange wireless communication transceiver, circuitry and/or interface 113, such as the Bluetooth Low energy interface, to receive the raw sensor data from the gesture sensing sleeve 101. The wireless link 113 between the gesture sleeve 101 and the mobile device 103 may be, for example, short range wireless communication protocols, such as Bluetooth, Bluetooth Low Energy, WLAN, ZigBee, NFC, ANT, ANT+ etc. The mobile communications device 103 further includes a sleeve gateway application 103a for communication of the raw sensor data over a wireless telecommunications transceiver, circuitry and/or link 107' and 107, to the backend server 104 of the control service 108. The link 107 and 107' may be, for example, the wireless IoT communication protocols, such as SigFox, LoRaWAN, NB-IoT, etc., and Wireless telecommunication protocols such as 2G, LTE, 4G, 5G, any future G, etc. The example control service 108 is shown including component control services 108A, 108B, and 108C to respectively provide control signals to a drone 114A, a car 114B, or a mouse 114C. The control signals are communicated from the control service 108 over a wireless telecommunications transceiver, circuitry and/or link 119, such as the wireless IoT communication protocols, such as SigFox, LoRaWAN, NB-IoT, etc., and Wireless telecommunication protocols such as 2G, LTE, 4G, 5G, any future G, etc., to the one or more controlled devices 114.

Figure 1E:
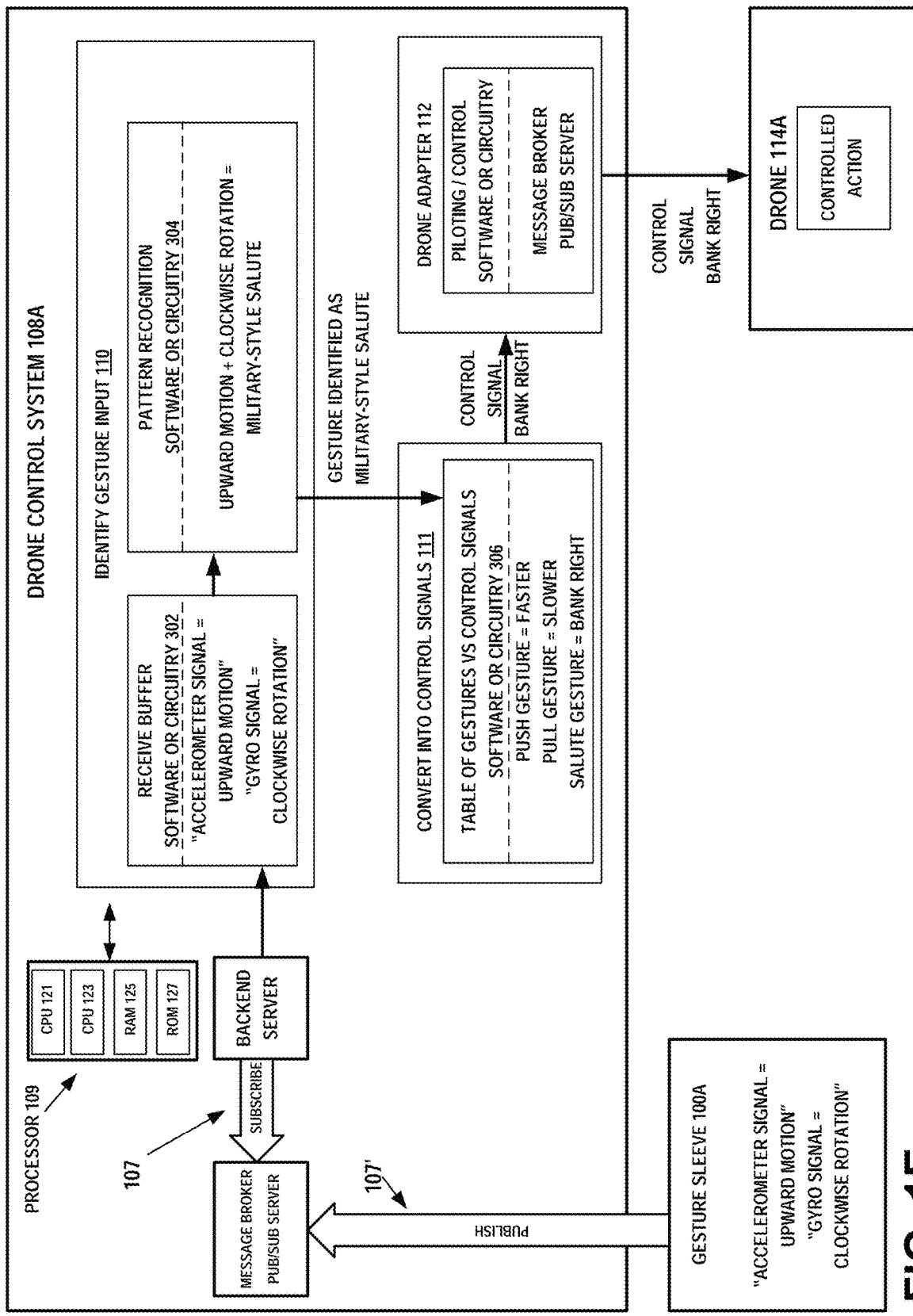
FIG. 1E shows an example architecture diagram of another example embodiment, showing example software or circuitry of an example drone control system and an example of processing gesture signals from a gesture sensing device to control an example controlled drone device of FIG. 1B.

FIG. 1E shows an example architecture diagram of another example embodiment, showing example software or circuitry of an example drone control system 108A and an example of processing gesture signals from a gesture sensing device 100A to control an example controlled drone device 114A of FIG. 1B.

An example software or circuitry to identify a body-action input at 110 may be by pattern recognition. In the example shown, the user wearing the example gesture sleeve 100A on an arm, raises the arm in an upward direction and rotates the arm in a clockwise direction to touch the forehead, the combination of motions resembling a military-style salute. The user has the intention of controlling an example drone unmanned aerial device 114A to bank right while in flight. The example gesture sleeve 100A includes an example accelerometer and an example gyroscope that sense the upward motion and the clockwise rotation of the user's arm. The example gesture sleeve 100A publishes the raw sensor data from the accelerometer and the gyroscope at 107' to an example intermediary messaging broker publish/subscription server 102, to be buffered until they are subscribed at 107 by the example backend server 104.

The raw sensor data from the accelerometer and the gyroscope are then transferred to the example identify gesture input logic 110 of the drone control system 108A, where it is received in an example receive buffer software or hardware 302. The raw sensor data bearing signals representing the upward motion and clockwise rotation is transferred to the example pattern recognition software or circuitry 304, where the combination of the upward motion indication and the clockwise rotation indication is determined to have a pattern of a military-style salute. Information indicating that the identified gesture is a military-style salute is then transferred to the example convert into control signals logic 111.

The example convert into control signals logic 111 includes an example table of gestures versus control signals software or circuitry 306. The example table 306 converts the information indicating that the identified gesture is a military-style salute, into one or more control signals representing the bank-right control indication. The example table 306 transfers the bank-right control indication as one or more control signals to the example device adapter 112, to control the example drone device 114A. The example control service 108 then provides the one or more control signals to control the example drone device 114A, in response to the user's one or more body-actions while interacting with the example gesture sleeve device 100A.

Figure 1F:
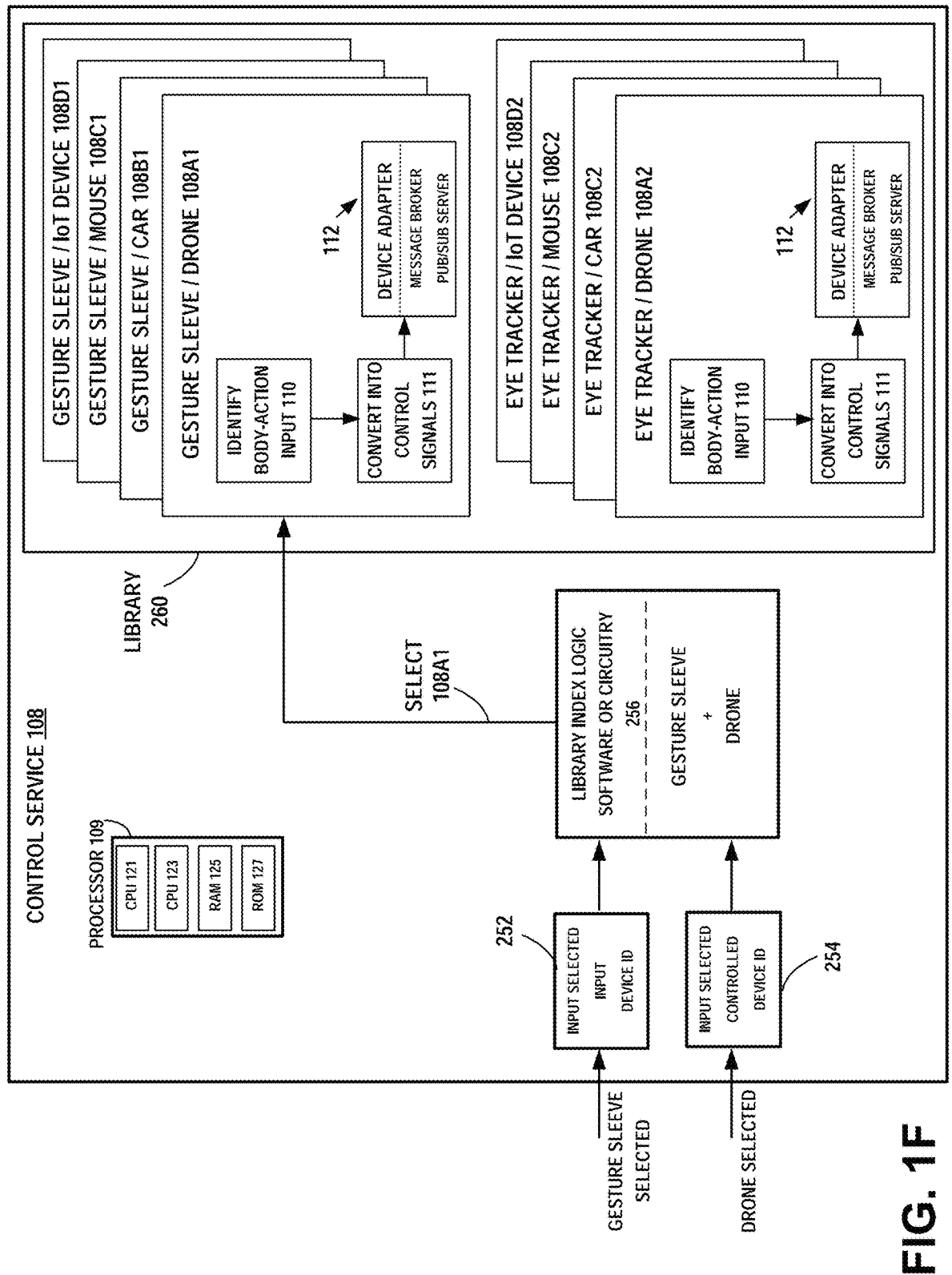
FIG. 1F shows an example architecture diagram of another example embodiment, showing example software or circuitry of an example library index logic in the example control service, to select a device control system based on an identification of a selected body-action input device and/or an identification of a selected controlled device, of FIG. 1B.

FIG. 1F shows an example architecture diagram of another example embodiment, showing example software or circuitry of an example library index logic 256 in the example control service 108, to select a device control system 108A1 based on an identification of a gesture sleeve as the selected body-action input device and an identification of the drone as the selected controlled device, of FIG. 1B. The user, for example selects a gesture sleeve as the selected body-action input device, which is input to the input buffer 252. The user or the system, for example, selects the drone as the selected controlled device, which is input to the input buffer 254. Information of the selected gesture sleeve and the selected drone is input to the library index logic software or circuitry 256, which determines the address in the library 260 of the device control system 108A1 or a location of the device control system 108A1 at another site not within the library 260. The library index logic software or circuitry 256 selects, for example, the component control service 108A1, from the plurality of component control services 108A1, 108B1, 108C1, and 108D1 that may be controlled by the gesture sleeve, and the plurality of component control services 108A2, 108B2, 108C2, and 108D2 that may be controlled by an eye tracker input device. The selection of the component control service 108A1 is based on the identification of a selected body-action input device, the gesture sleeve 100A and the identification of a selected controlled device, the drone 114A.

Figure 2A:
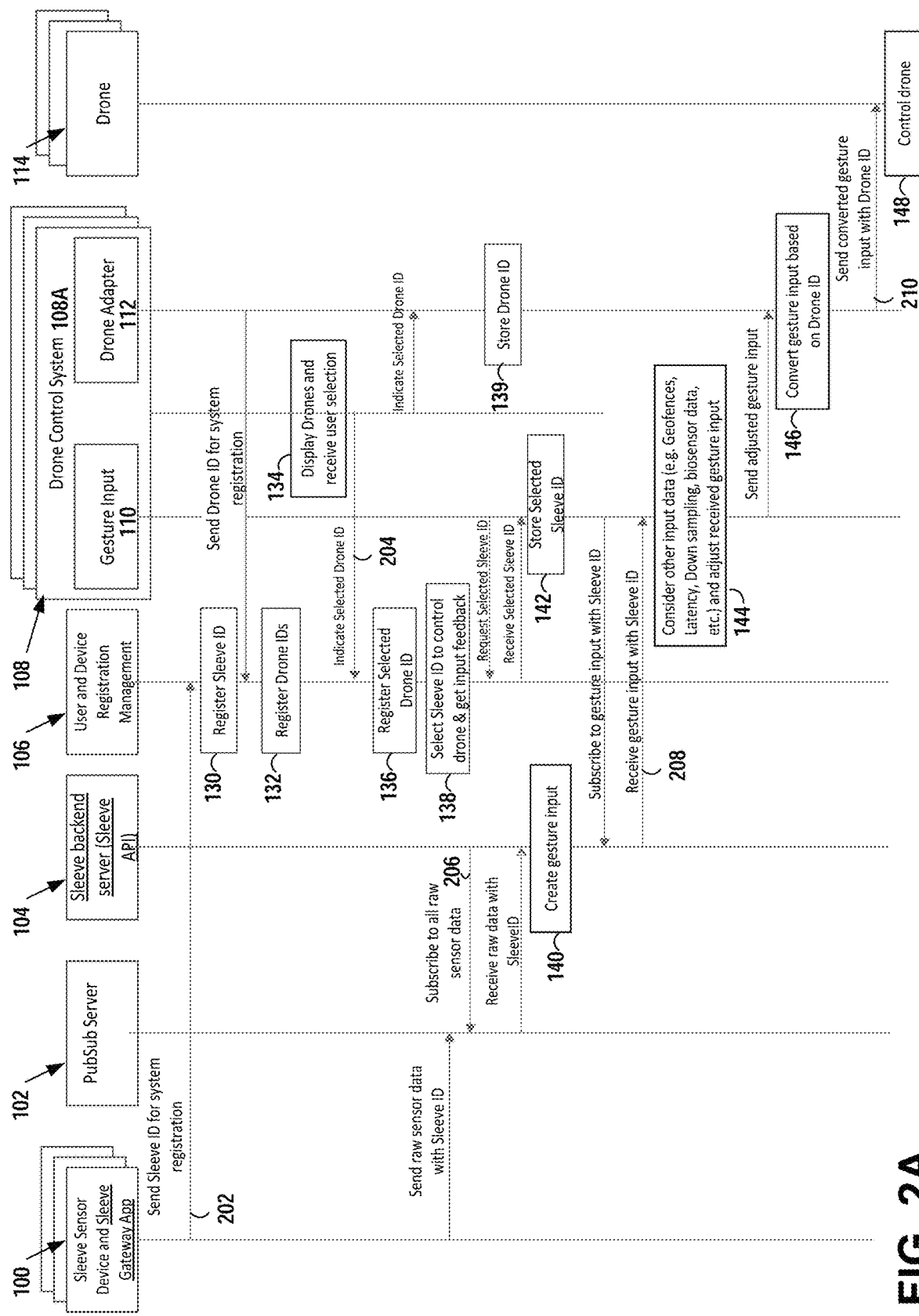
FIG. 2A shows an example embodiment of sequence diagram of operation of the example control service for controlling devices with body-action input devices, wherein an example of the body-action input device is a gesture sensing device and an example of the controlled device is a drone of FIG. 1B.

FIG. 2A shows an example embodiment of a sequence diagram of operation of the example control service 108 for controlling one or more devices 114 with one or more body-action input devices 100, wherein an example of the body-action input device 100 is a gesture sensing device and an example of the controlled device 114 is a drone of FIG. 1B.

Signal 202, comprising an identification (ID) information of a selected gesture sleeve 100 input device, is received by the registration management unit 106 that is connected to the control service 108, and registered at 130, providing identification information of the selected gesture sleeve 100 input device selected by a user from a plurality of available body-action input devices. Available one or more drones are registered at 132 with their respective drone IDs. The one or more drone IDs may be received from a user, such as a system operator, that may input the one or more drone IDs to the control service 108.

Alternative or additional to the registration at the 132, signal 204, comprising an indication of a selected drone identification (ID), is received by the user and device registration management unit 106 of the control service 108, and registered at 136, providing identification information of the selected drone ID that further indicates a related controlled device 114 selected by the user, such as the system operator, from a plurality of available controlled devices displayed on a user interface that is connected to the control service 108, at 134.

Signal 206 is transmitted to the intermediary messaging broker 102 by the sleeve backend server 104 of the control service 108, to subscribe one or more sensor signals from one or more, or all, connected gesture sleeve input devices 100 available at the intermediary messaging broker 102, the one or more sensor signals including raw sensor data corresponding to the user's one or more body-actions while interacting with the gesture sleeve input device 100.

The control system 108 stores the selected drone ID at 139 and stores the selected sleeve ID at 142. The control system 108 selects or creates a respective component control service, for example the drone control system 108A, from a plurality of component control services, each component control service corresponding to one of the plurality of available body-action input devices and one of the plurality of available controlled devices. The selection or creation of the drone control system 108A is based on the identification information of the selected gesture sleeve input device 100 and the identification information of the selected drone 114A controlled device. In an alternative example, drone adapter 112 in the control system 108 further stores the selected drone ID at 139 and the gesture input function 110 requests the registered sleeve ID and stores the sleeve ID at 142. Then the control system 108 selects or creates a component control service, the drone control system 108A, from a plurality of component control services, each component control service corresponding to one of the plurality of available body-action input devices and one of the plurality of available controlled devices based on the ID of the selected gesture sleeve input device 100 and the ID of the selected drone 114A controlled device. Still in another alternative example, the selection of the gesture input function 110 is based on the selected sleeve input device 110, and the selection of the drone adapter 112 is based on the selected drone 114A. The gesture input function 110 and the drone adapter 112 are then connected by the control system 108 to create a new component control service, for example the drone control system 108A. Still in another alternative example, the selection or creation of one or more drone control systems can be done in the user and device registration management unit 106 based on one or more registered sleeve IDs and drone IDs by pairing and/or connecting them to each other in all possible combinations.

The raw sensor data is received at 140 and a gesture input is identified and/or created and sent with signal 208 to the drone control system of the control service 108. The drone control system of the component control service 108A, may further analyze other input data at 144 to adjust the identified and/or created gesture input, by considering the other input data comprising for example at least one of geo-fence data, biosensor data, latency, or down sampling. The adjusted gesture input is then sent to 146 at the drone adapter. In an alternative example, the raw sensor data is received at the backend server 104 after subscription at 140 and the gesture input is identified and/or created from the raw sensor data. Then at 208 the drone control system of the control service 108 subscribes the gesture input from the backend server 104. The drone control system of the component control service 108A, analyzes at 144, other input date, to adjust the identified and/or created gesture input, by considering other input data comprising for example at least one of geo-fence data, biosensor data, latency, or down sampling. The adjusted gesture input is then sent to 146.

The drone control system of the component control service 108A, converts the identified gesture input, into one or more control signals, at 146 to control the selected drone controlled device 114 corresponding to the user's one or more body-actions while interacting with the selected gesture sleeve input device 100.

Signal 210 provides at 148, the one or more control signals to control the selected drone controlled device 114 in response to the user's one or more gestures while interacting with the selected gesture sleeve input device 100. The control signals are subscribed by the drone controlled device 114, so that the controlled device 114 does not need to manage the control signal data flow. In an alternative example, the signal is transmitted to the selected drone controlled device 114.

Figure 2B:
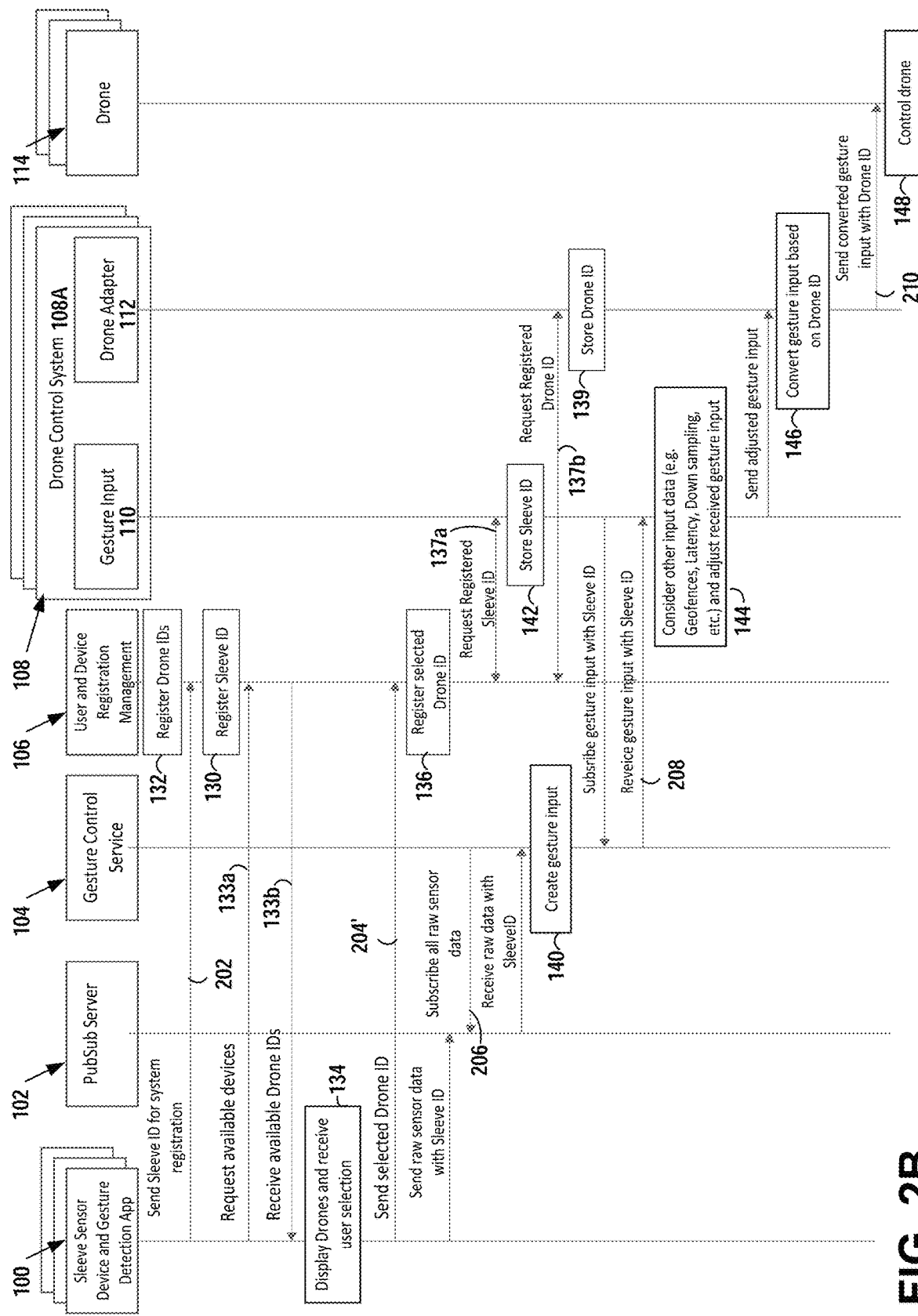
FIG. 2B shows an example embodiment of sequence diagram of operation of the example control service for controlling devices of FIG. 2A, wherein the identity of available controllable devices is requested.

FIG. 2B shows an example sequence diagram of operation of the example control service 108 for controlling devices 114 of FIG. 2A, wherein the user and device registration management unit 106 receives at 133a from a sleeve input device 100 a request for the identity information of one or more available controllable devices 114, wherein the identity can comprise, for example, a device identification (ID), a device name, a device type, a description of a device, or technical requirements of the device. The user and device registration management unit 106 selects and sends back the requested identity information to the sleeve input device 100 at 133b. The received information are displayed to the user on a user interface at 134. Signal 204' with the identity information of the selected drone is received at the registration management unit 106 of the control server 108, and stored at 136. At 137a the gesture input 110 requests and receives the registered sleeve ID from the user and device registration management unit 106, and stores it at 142. At 137b the drone adapter 112 requests and receives the selected drone ID from the user and device registration management unit 106, and stores it at 139. The remaining sequence of operations in FIG. 2B are the same as those shown on FIG. 2A.

Figure 2C:
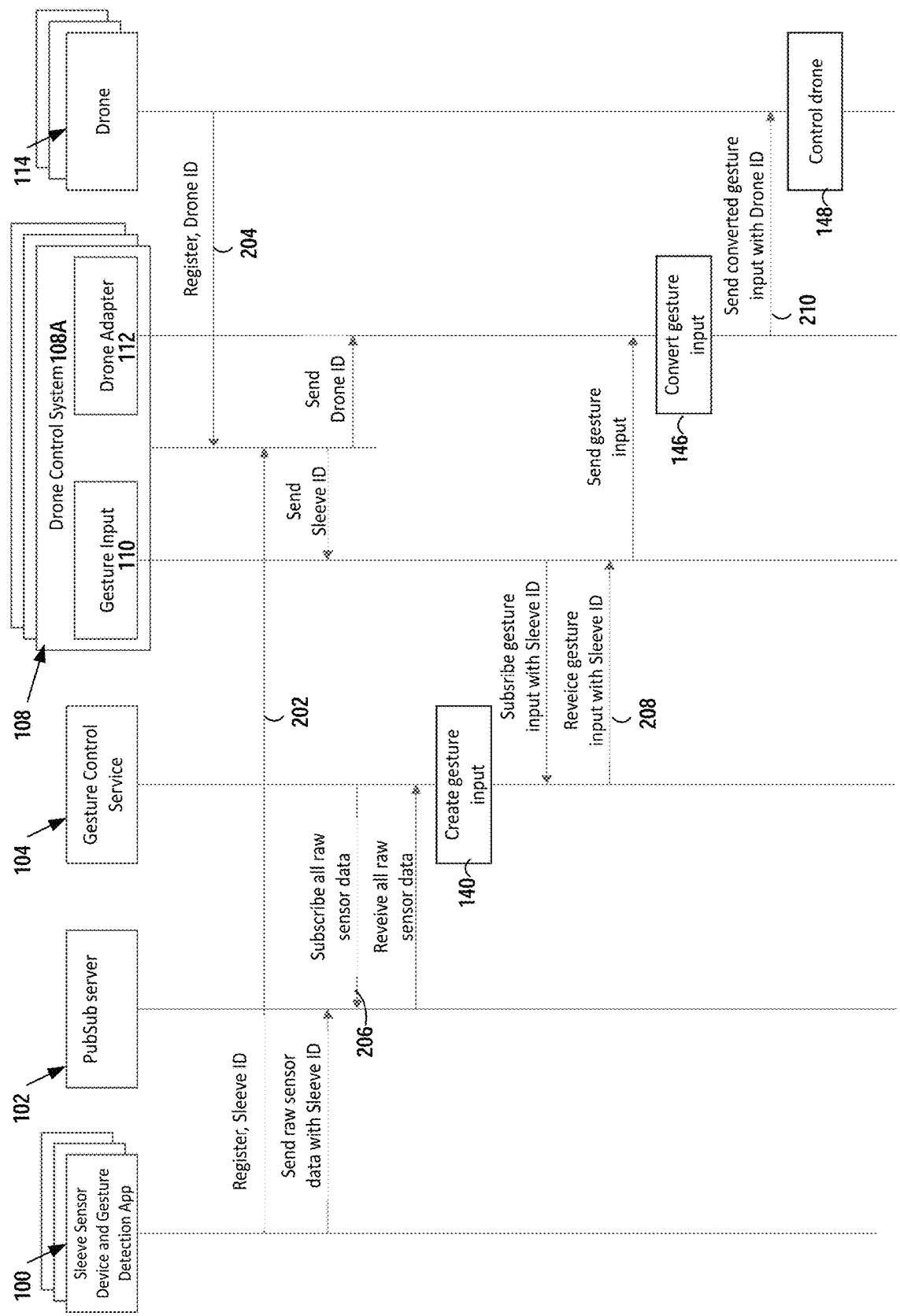
FIG. 2C shows an example embodiment of sequence diagram of operation of the example control service for controlling devices of FIG. 2A, wherein user and controllable device registration management operations are omitted.

FIG. 2C shows an example sequence diagram of operation of the example control service 108 for controlling devices 114 of FIG. 2A, wherein user and controllable device registration management operations are omitted. The drone 114 is shown sending signal 204 with its drone ID to the drone control system 108A of the component control service 108A. Further, the drone control system 108A receives a sleeve ID from the sleeve sensor device 100 for registration at 202. Further the registered sleeve ID is sent to the gesture input 110 and the registered drone ID is sent to the drone adapter 112.

Figure 2D:
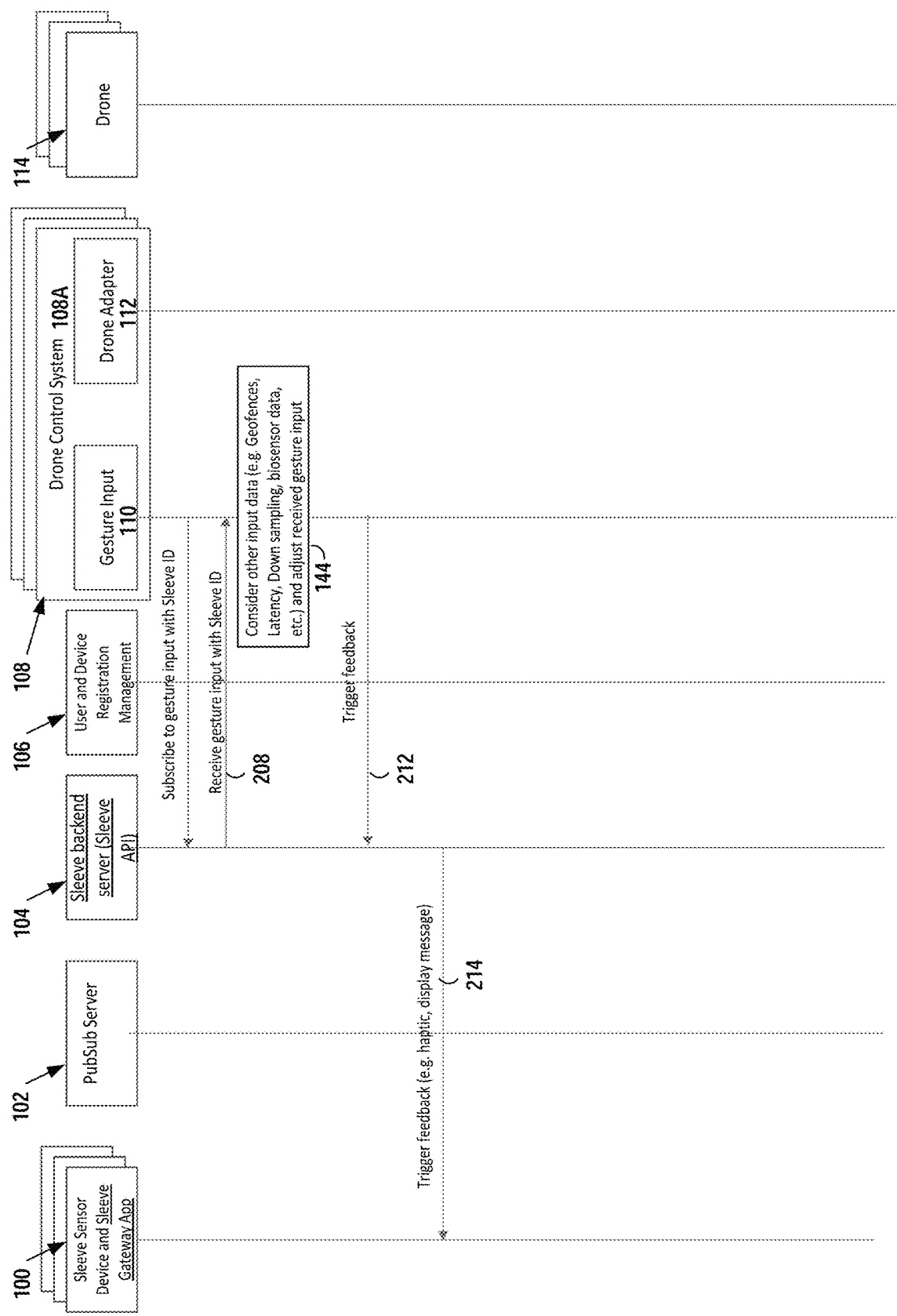
FIG. 2D shows an example embodiment of sequence diagram of operation of the example control service for controlling devices of FIG. 1B, wherein the control service feeds back to the body-action input device, trigger messages, in response to other input data.

FIG. 2D shows an example sequence diagram of operation of the example control service 108 for controlling devices 114 of FIG. 1B, wherein the control service 108 feeds back to the gesture sleeve input device 100, one or more trigger message signals 212, in response to a determination at 144 of other input data, comprising at least one of geo-fence data, biosensor data, latency, or down sampling.

For example, the backend server 104 may measure the quality of the wireless communications link 107/107' to the gesture sleeve input device 100 and send measurement results to the drone control system 108. In response to the measurement results, the drone control system 108 may send a trigger message 212 at 144 to the gesture sleeve device 101 to lower data sampling of the raw sensor data, when the link quality is at a reduced level. In an alternative example, the backend server 104 may measure the quality, such as a latency, of the wireless communications link 107/107' to the gesture sleeve input device 100. In response to the measurement, the backend server 104 may send the quality information of the communication link with the signal 208 to the gesture input 110 for further consideration and analysis at 144. For example, the analysis may trigger a signal 212 and 214 to the gesture sleeve device 101 to lower data sampling of the raw sensor data, when the link quality is reduced over a threshold level.

In a similar manner, the Bluetooth LE (BLE) link 113 between the gesture sleeve 101 and the sleeve gateway app 103a in the mobile device 103, and the LTE (or WiFi) link 107/107' between the sleeve gateway app 103a and the backend server 104, may become congested or interfered with so that the system cannot send data at full desired rate. The sleeve gateway app 103a may measure BLE transmissions or missed data packets and instruct the gesture sleeve 101 to reduce its sampling rate. Another option is to change sampling of some sensors to a lower rate (down sampling) while leaving sampling of other sensors at a higher rate. In addition, if needed multiple data samples may be batched and sent in one data packet from the gesture sleeve device 101 to the sleeve gateway app. in the mobile device 103, reducing packet overhead.

As another example, the backend server 104 may measure signal delay of the wireless communications link 107/107' to the gesture sleeve input device 100 to determine latency of the link. A data packet may be sent from the backend server 104 to the gateway in the mobile device 103 and a reply from the gateway to the backend may be measured for the roundtrip that is divided by 2 to determine the latency. Another option is to have a timestamp in every data packet and determine the variance in the difference (received TS−send TS), which if increasing, is an indication that less data should be sent. In response to the measurement, the backend server 104 may lower data sampling of the raw sensor data from the input device 100, when the latency of the link is high. The backend server 104 may send trigger signals 214 at 144, to the gesture input device 100 to reduce the data rate of the raw sensor data being sent. Still in another example, the drone adapter 112 may measure a signal delay of a wireless communications link between the drone adapter 112 and the drone 114 to determine latency of the link. A data packet may be sent from the drone adapter 112 to the drone 114 and a reply from the drone 114 to the drone adapter 112 may be measured for the roundtrip that is divided by 2 to determine the latency. Another option is to detect a timestamp in every data packet and determine the variance in the difference (received TS−send TS), which if increasing, is an indication that less data should be sent. In response to the measurement, the drone adapter 112 may lower its data sampling of the converted gesture input, when the latency of the link is high.

Figure 2E:
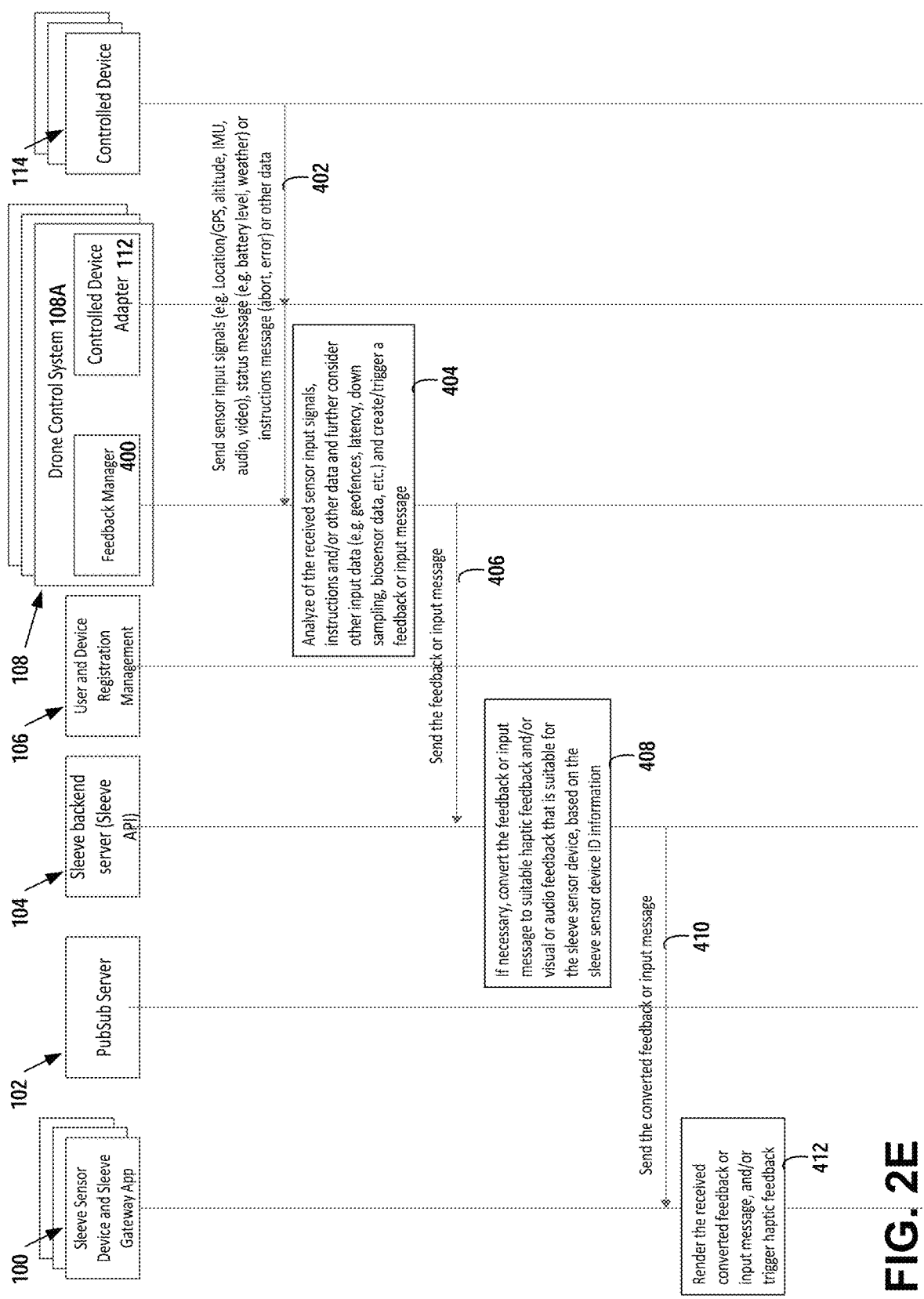
FIG. 2E shows an example embodiment of sequence diagram of operation of the example control service for controlling devices of FIG. 1B, wherein the controlled device feeds back to the sleeve sensor device and sleeve gateway app, sensor input signals or other data.

FIG. 2E shows an example embodiment of sequence diagram of operation of the example control service 108 for controlling devices 114 of FIG. 1B, wherein the controlled device 114 feeds back to the sleeve sensor device and sleeve gateway app 100, sensor input signals 402 (e.g. Location/GPS, altitude, IMU, audio, video), status message (e.g. battery level, weather) or instruction messages (abort, error) or other data, in response to other input data. The feedback manager 400 analyzes at 404 the received sensor input signals 402, instructions and/or other data and further considers other input data (e.g. geo-fences, latency, down sampling, biosensor data, etc.) and creates/triggers a feedback or input message 406, which is sent to the sleeve backend server (sleeve API) 104. If necessary, the sleeve backend server (sleeve API) 104 converts at 408 the feedback or input message to suitable haptic feedback and/or visual or audio feedback that is suitable for the sleeve sensor device 100, based on the sleeve sensor device ID information. The sleeve backend server (sleeve API) 104 then sends the converted feedback or input message 410 to the sleeve sensor device and sleeve gateway app 100, where the received converted feedback or input message 410 is rendered and/or triggers haptic feedback.

Figure 2F:
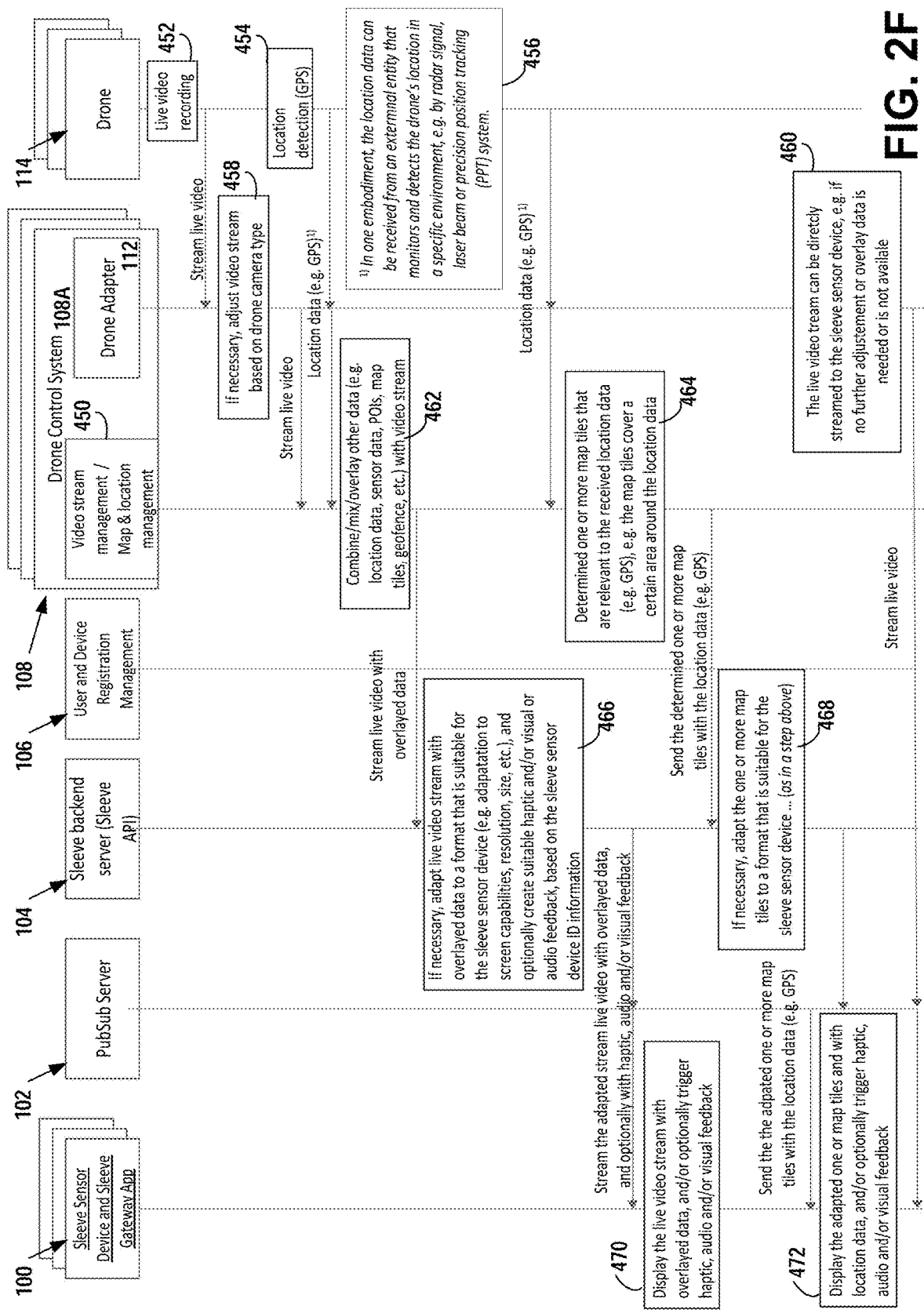
FIG. 2F shows an example embodiment of sequence diagram of operation of the example control service for controlling devices of FIG. 1B, wherein the controlled device feeds back to the sleeve sensor device and sleeve gateway app 100, a video stream or one or more map tiles.

FIG. 2F shows an example embodiment of sequence diagram of operation of the example control service 108 for controlling devices 114 of FIG. 1B, wherein the controlled device 114 feeds back to the sleeve sensor device and sleeve gateway app 100, a video stream or one or more map tiles. Controlled device 114 is a drone that performs live video recording at 452 and performs location detection at 454. In one embodiment at 456, the location data can be received from an external entity that monitors and detects the drone's location in a specific environment, e.g. by radar signal, laser beam or precision position tracking (PPT) system. The drone 114 sends a live video and location data to the drone adapter 112. The live video stream can be directly streamed at 460 to the sleeve sensor device 100, e.g. if no further adjustment or overlay data is needed or is not available. The drone adapter 112, if necessary, adjusts at 458 the video stream based on drone camera type and then sends the steam live video to the video stream management/map & location management 450, where the video stream is combined/mixed/overlaid at 462 with other data (e.g. location data, sensor data, POIs, map tiles, geo-fence, etc.) and sent on to the sleeve backend server (sleeve API)104. The sleeve backend server (sleeve API)104, if necessary, will adapt live video stream at 466 with overlaid data to a format that is suitable for the sleeve sensor device 100 (e.g. adaptation to screen capabilities, resolution, size, etc.), and optionally create suitable haptic and/or visual or audio feedback, based on the sleeve sensor device ID information. The sleeve backend server (sleeve API)104 then streams the adapted stream live video with overlaid data, and optionally with haptic, audio and/or visual feedback, to the sleeve sensor device and sleeve gateway app 100 where it displays at 470 the live video stream with overlaid data, and/or optionally trigger haptic, audio and/or visual feedback.

Also shown in FIG. 2F shows the video stream management/map & location management 450 may determine one or more map tiles at 464 that are relevant to the received location data (e.g. GPS), e.g. the map tiles cover a certain area around the location data. The video stream management/map & location management 450 sends the determined one or more map tiles with the location data (e.g. GPS) to sleeve backend server (sleeve API)104, where, if necessary, it adapts at 468 the one or more map tiles to a format that is suitable for the sleeve sensor device 100, and then sends the adapted one or more map tiles with the location data (e.g. GPS) to the sleeve sensor device and sleeve gateway app 100, where the adapted one or map tiles is displayed at 472 with location data, and/or optionally trigger haptic, audio and/or visual feedback.

Figure 3:
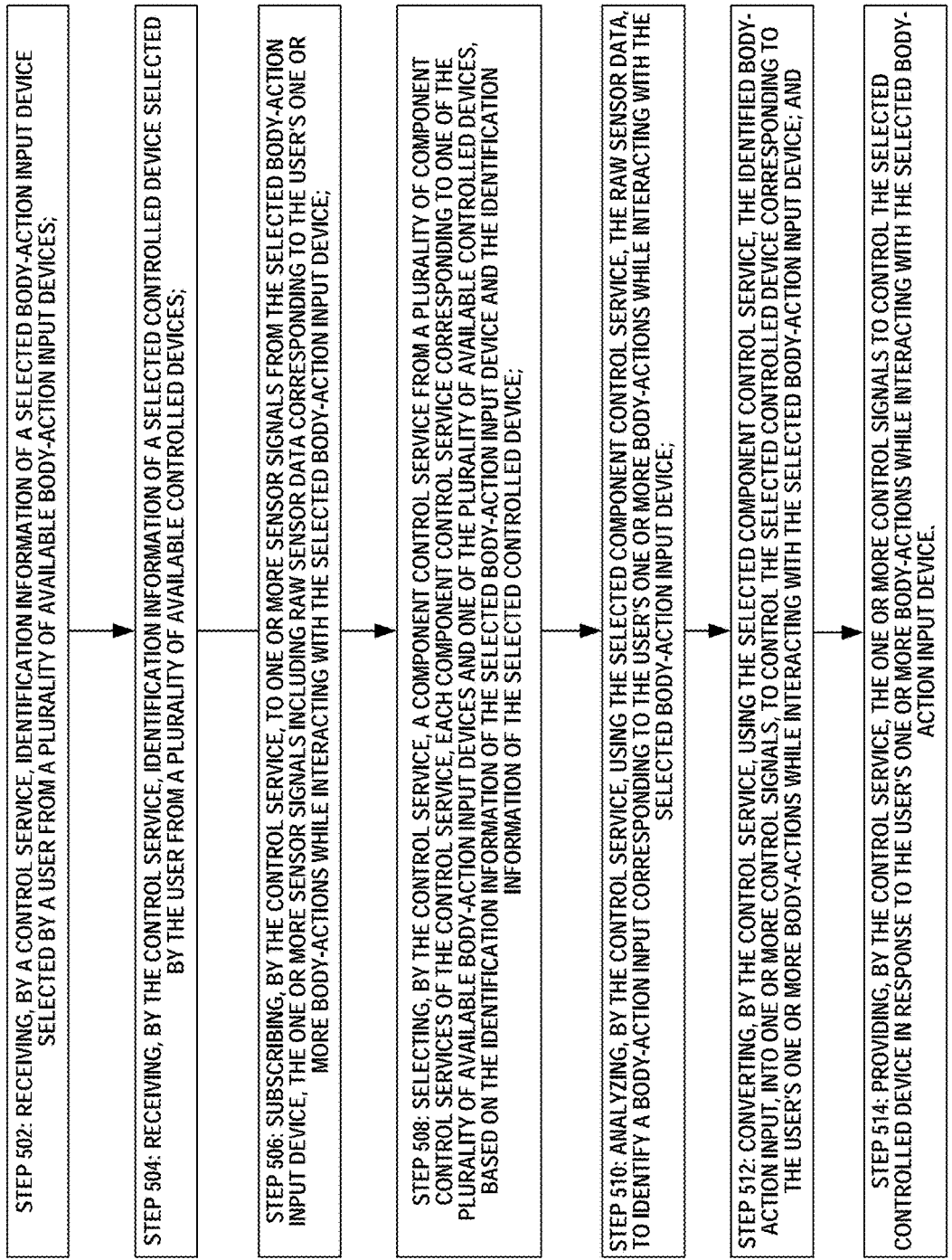
FIG. 3 illustrates an example flow diagram of operational steps in the example embodiment of an example control service for controlling devices with body-action input devices of FIG. 1A.

FIG. 3 illustrates an example flow diagram 500 of operational steps in the example embodiment of an example control service 108 for controlling devices with body-action input devices 100 of FIG. 1A. The steps of the flow diagram represent one or more computer code instructions stored in the one or more RAM and/or ROM memories in the one or more devices of the apparatus of the control service, which when executed by the one or more central processing units (CPUs) of the one or more devices of the apparatus of the control service, are configured to cause the apparatus at least to carry out the functions of the example embodiments. Alternatively, the steps of the flow diagram represent one or more computer code instructions stored in the one or more circuitries in the one or more devices of the apparatus of the control service, which when executed by the one or more circuitries of the one or more devices of the apparatus of the control service, are configured to cause the apparatus at least to carry out the functions of the example embodiments. The steps may be carried out in another order than shown and individual steps may be combined or separated into component steps. In some embodiments, one or more steps may be optional. The flow diagram has the following steps:

Step 502: receiving, by a control service, identification information of a selected body-action input device selected by a user from a plurality of available body-action input devices;

Step 504: receiving, by the control service, identification information of a selected controlled device selected by the user from a plurality of available controlled devices;

Step 506: subscribing, by the control service, to one or more sensor signals from the selected body-action input device, the one or more sensor signals including raw sensor data corresponding to the user's one or more body-actions while interacting with the selected body-action input device;

Step 508: selecting, by the control service, a component control service from a plurality of component control services of the control service, each component control service corresponding to one of the plurality of available body-action input devices and one of the plurality of available controlled devices, based on the identification information of the selected body-action input device and the identification information of the selected controlled device;

Step 510: analyzing, by the control service, using the selected component control service, the raw sensor data, to identify a body-action input corresponding to the user's one or more body-actions while interacting with the selected body-action input device;

Step 512: converting, by the control service, using the selected component control service, the identified body-action input, into one or more control signals, to control the selected controlled device corresponding to the user's one or more body-actions while interacting with the selected body-action input device; and Step 514: providing, by the control service, the one or more control signals to control the selected controlled device in response to the user's one or more body-actions while interacting with the selected body-action input device.

Figure 4:
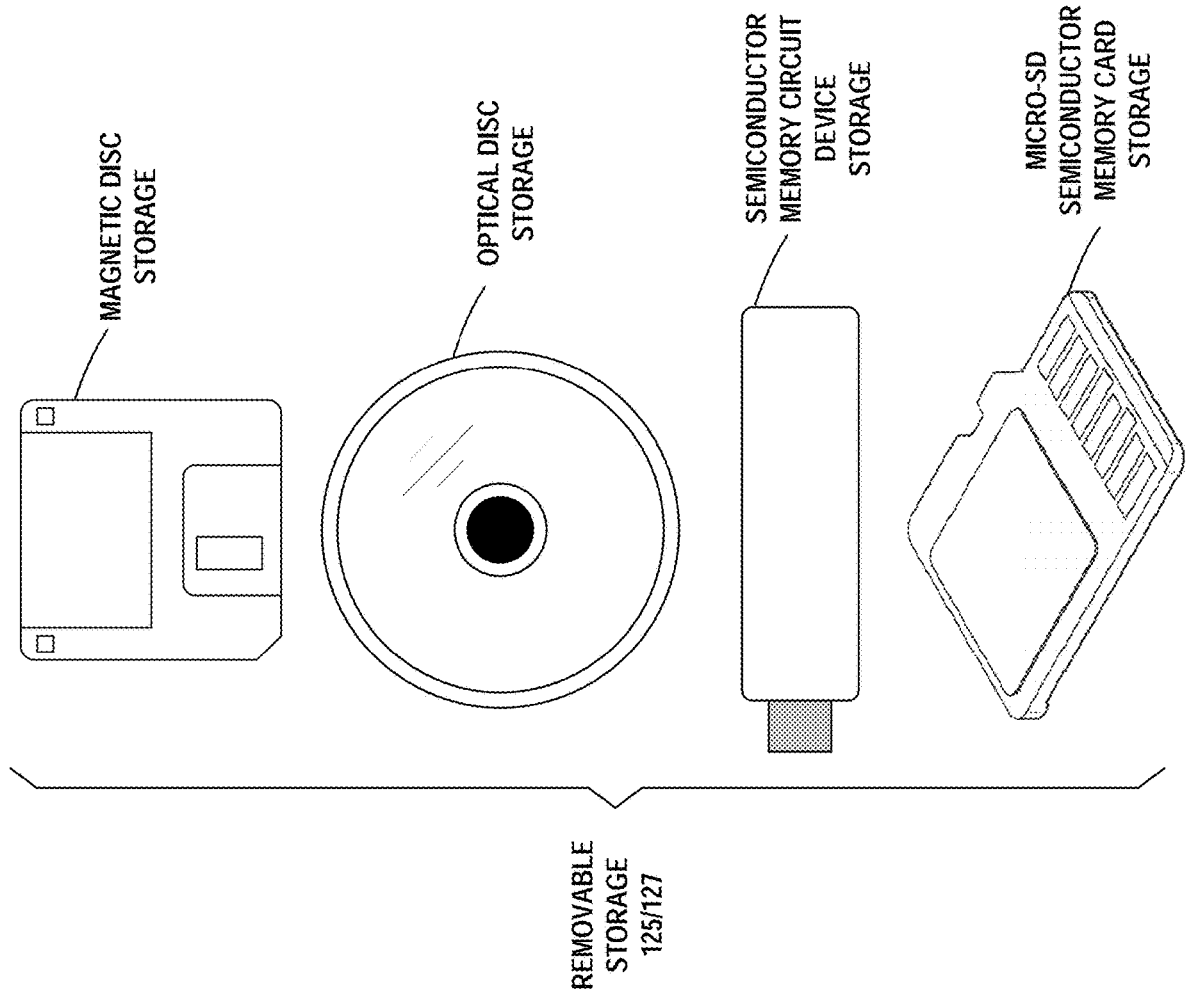
FIG. 4 illustrates an example embodiment, wherein examples of removable storage media are shown.

FIG. 4 illustrates an example embodiment, wherein examples of removable storage media 125/127 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with an example embodiment.

Some of the advantages of the example embodiments include the following:

Whether the main functionalities of an example control service 108 are implemented as software or circuitry or in cloud servers, it is easy to deploy new versions with added functionality or improved processing. A new version may be released every day and deployed to the control service 108 to provide new functionality to all users. There is no need for the end user to flash the gesture sleeve device 100 or install a new sleeve gateway application.

The control distance between the gesture server 100 and the backend server 104 is not an issue.

The embodiments enable multiple drone (IoT) device management in a multi-device scalable system.

The embodiments enable multiple sleeves to control one device.

The embodiments enable one person with two sleeve devices to control one drone.

The embodiments enable two persons with their own sleeve devices to control one drone and a camera on the drone.

The embodiments enable dataflow to be adapted for reliable delivery over the network.

The embodiments enable the sleeve device to be simple, since most of the intelligence is implemented in the control server.

The embodiments enable logical elements and functions to be implemented in any network (e.g. a home network).

The control service for a drone may also consider other criteria not directly relating to the flight control of the drone, to adjust the gesture input to the drone, such as the latency of the system.

Although specific example embodiments have been disclosed, a person skilled in the art will understand that changes may be made to the specific example embodiments.

What is claimed is:

1. A method, comprising:
receiving, by a control service, identification information of a wearable body-action input device;
receiving, by the control service, identification information of a controlled device;
selecting, by the control service, a component control service from a plurality of component control services of the control service, based on the identification information of the wearable body-action input device and the identification information of the controlled device;
receiving over a wireless communication, by the control service, one or more digital sensor signals, with raw sensor data, of body actions of the wearable body-action input device;
converting, by the control service, using the component control service, the identified body-action input, into one or more control signals, to control the controlled device corresponding to one or more body-actions with the wearable body-action input device; and
publishing, by the control service, the one or more control signals to control the controlled device in response to the one or more body-actions of the wearable body-action input device.

2. The method of claim 1, further comprising:
receiving, by the control service, the identification information of the wearable body-action input device selected from a plurality of available body-action input devices;
receiving, by the control service, the identification information of the controlled device selected from a plurality of available controlled devices; and
selecting, by the control service, the component control service from a plurality of component control services of the control service, each component control service corresponding to one of the plurality of available body-action input devices and one of the plurality of available controlled devices, based on the identification information of the wearable body-action input device and the identification information of the controlled device.

3. The method of claim 1, wherein the control service subscribes to the raw sensor data via a communications gateway, so that the control service manages sensor data flow from the wearable body-action input device.

4. The method of claim 1, wherein the one or more received sensor signals comprises at least one or more sensor signals in response to hand gestures of a user, sensor signals in response to body-actions of the user, sensor signals in response to heartbeats of the user, or sensor signals in response to eye-motion of the user.

5. The method of claim 1, wherein the controlled device is at least one of a drone controlled over a wireless communications link, an unmanned terrestrial vehicle controlled over a wireless communications link, a physical device controlled over a wireless communications link, a home appliance controlled over a wireless communications link, or an industrial appliance controlled over a wireless communications link.

6. The method of claim 1, wherein the control service is a pool of configurable system resources residing on one or more cloud servers and comprises one or more component control services, wherein the one or more component control services are configured to identify a body-action input for a specific wearable body-action input device and convert the identified body-action input, into one or more control signals, for a specific controlled device.

7. The method of claim 1, wherein the control service adjusts the identified body-action input to modify the one or more control signals, in response to other input data including at least one of geo-fence data, biosensor data, latency, or down-sampling.

8. The method of claim 1, wherein the control service subscribes to the raw sensor data from the wearable body-action input device via a wireless communications link;
measuring, by the control service, quality of the wireless communications link to and from the wearable body-action input device; and
causing, by the control service, to send instructions to the wearable body-action input device to down-sampling raw sensor data, when the link quality is reduced.

9. The method of claim 1, wherein the control service subscribes to the raw sensor data from the wearable body-action input device via a wireless communications link;
measuring, by the control service, signal delay of the wireless communications link to and from the wearable body-action input device to determine latency of the link; and
causing, by the control service, to send down-sampling instructions to the wearable body-action input device, when the latency is high.

10. The method of claim 1, wherein the control service feeds back to the wearable body-action input device, trigger messages with instructions for presentation by the wearable body-action input device or instructions for adjusting of the wearable body-action input device, in response to other input data including at least one of geo-fence data, biosensor data, latency, or down-sampling.

11. An apparatus, comprising:
at least one processor;
at least one memory including computer program code;
the at least one memory and the computer program code configured to, with the at least one processor, cause the apparatus at least to:
receive, by a control service, identification information of a wearable body-action input device;
receive, by the control service, identification information of a controlled device;
select, by the control service, a component control service from a plurality of component control services of the control service, based on the identification information of the wearable body-action input device and the identification information of the controlled device;
receive over a wireless communication, by the control service, one or more digital sensor signals, with raw sensor data, of body actions of the wearable body-action input device;
analyze, by the control service, using the component control service, the raw sensor data, to identify a body-action input corresponding to the one or more body-actions of the wearable body-action input device;
convert, by the control service, using the component control service, the identified body-action input, into one or more control signals, to control the controlled device corresponding to one or more body-actions with the wearable body-action input device; and
publish, by the control service, the one or more control signals to control the controlled device in response to the one or more body-actions of the wearable body-action input device.

12. The apparatus of claim 11, further comprising:
the at least one memory and the computer program code configured to, with the at least one processor, cause the apparatus at least to:
receive, by the control service, the identification information of the wearable body-action input device selected from a plurality of available body-action input devices;
receive, by the control service, the identification information of the controlled device selected from a plurality of available controlled devices; and
select, by the control service, the component control service from a plurality of component control services of the control service, each component control service corresponding to one of the plurality of available body-action input devices and one of the plurality of available controlled devices, based on the identification information of the wearable body-action input device and the identification information of the controlled device.

13. The apparatus of claim 11, wherein the control service subscribes to the raw sensor data via a communications gateway, so that the control service manages sensor data flow from the wearable body-action input device.

14. The apparatus of claim 11, wherein the one or more received sensor signals comprises at least one or more sensor signals in response to hand gestures of a user, sensor signals in response to body-actions of the user, sensor signals in response to heartbeats of the user, or sensor signals in response to eye-motion of the user.

15. The apparatus of claim 11, wherein the controlled device is at least one of a drone controlled over a wireless communications link, an unmanned terrestrial vehicle controlled over a wireless communications link, a physical device controlled over a wireless communications link, a home appliance controlled over a wireless communications link, or an industrial appliance controlled over a wireless communications link.

16. The apparatus of claim 11, wherein the control service is a pool of configurable system resources residing on one or more cloud servers and comprises one or more component control services, wherein the one or more component control services are configured to identify a body-action input for a specific wearable body-action input device and convert the identified body-action input, into one or more control signals, for a specific controlled device.

17. The apparatus of claim 11, wherein the control service adjusts the identified body-action input to modify the one or more control signals, in response to other input data including at least one of geo-fence data, biosensor data, latency, or down-sampling.

18. The apparatus of claim 11, wherein the control service subscribes to the raw sensor data from the wearable body-action input device via a wireless communications link;
the at least one memory and the computer program code configured to, with the at least one processor, cause the apparatus at least to:
measure, by the control service, quality of the wireless communications link to and from the wearable body-action input device; and
cause, by the control service, to send instructions to the wearable body-action input device to down-sampling raw sensor date, when the link quality is reduced.

19. The apparatus of claim 11, wherein the control service subscribes to the raw sensor data from the wearable body-action input device via a wireless communications link;

the at least one memory and the computer program code configured to, with the at least one processor, cause the apparatus at least to:

measure, by the control service, signal delay of the wireless communications link to and from the wearable body-action input device to determine latency of the link; and cause, by the control service, to send down-sampling instructions to the wearable body-action input device, when the latency is high.

20. The apparatus of claim 11, wherein the control service feeds back to the wearable body-action input device, trigger messages with instructions for presentation by the wearable body-action input device or instructions for adjusting of the wearable body-action input device, in response to other input data including at least one of geo-fence data, biosensor data, latency, or down-sampling.

\* \* \* \* \*